United States Patent [19]
Dautrich et al.

[11] Patent Number: 4,972,485
[45] Date of Patent: Nov. 20, 1990

[54] SPEAKER-TRAINED SPEECH RECOGNIZER HAVING THE CAPABILITY OF DETECTING CONFUSINGLY SIMILAR VOCABULARY WORDS

[75] Inventors: Bruce A. Dautrich, Jackson; Thomas W. Goeddel, Fair Haven, both of N.J.; David B. Roe, Tokyo, Japan

[73] Assignee: AT&T Bell Laboratories, Murray Hill, N.J.

[21] Appl. No.: 356,589

[22] Filed: May 23, 1989

Related U.S. Application Data

[63] Continuation of Ser. No. 841,968, Mar. 25, 1986, abandoned.

[51] Int. Cl.⁵ .............................................. G10L 5/00
[52] U.S. Cl. .................................................... 381/43
[58] Field of Search ................. 364/513.5; 381/41–45; 382/13–15

[56] References Cited

U.S. PATENT DOCUMENTS

| | | | |
|---|---|---|---|
| 3,333,248 | 7/1967 | Greenberg et al. | 382/15 |
| 3,816,722 | 6/1974 | Sakoe et al. | 381/42 |
| 4,297,528 | 10/1981 | Beno | 381/45 |
| 4,348,553 | 9/1982 | Baker et al. | 364/513.5 |
| 4,499,596 | 2/1985 | Casey et al. | 382/15 |
| 4,509,133 | 4/1985 | Monbaron et al. | 364/513.5 |
| 4,587,670 | 5/1986 | Levinson et al. | 381/43 |
| 4,618,984 | 10/1986 | Das et al. | 381/43 |
| 4,718,094 | 1/1988 | Bahl et al. | 381/43 |
| 4,783,802 | 11/1988 | Takebayashi et al. | 381/43 |

OTHER PUBLICATIONS

Jelinek, "Continuous Speech Recognition by Statistical Methods", Proceedings of the IEEE, vol. 64, No. 4, Apr. 1976, pp. 532–556.

Bakis, "Spoken Word Spotting Via Centisecond Acoustic States", IBM Technical Disclosure Bulletin, vol. 18, No. 10, Mar. 1976, pp. 3479–3481.

Bourlard et al, "Speaker Dependent Connected Speech Recognition Via Phonemic Markov Models", ICASSP 85, Mar. 26–29, 1985, Tampa, Fla., pp. 1213–1216.

S. E. Levinson, L. R. Rabiner and M. M. Sondhi, "An Introduction to the Application of the Theory of Probabilistic Functions of a Markov Process to Automatic Speech Recognition," The Bell System Technical Journal, vol. 62, No. 4, Apr. 1983, pp. 1035–1074.

L. L. Rabiner, S. E. Levinson and M. M. Sondi, "On the Application of Vector Quantization and Hidden Markov Models to Speaker Independent, Isolated Word Recognition," The Bell System Technical Journal, vol. 62, No. 4, Apr. 1983, pp. 1075–1105.

Primary Examiner—Dale M. Shaw
Assistant Examiner—David D. Knepper
Attorney, Agent, or Firm—John A. Caccuro

[57] ABSTRACT

During a training sequence, a speaker-trained speech recognizer detects and signals the speaker when vocabulary word pairs are potentially confusing to the recognizer. Each vocabulary word is converted into feature signals and then parameters representing a predetermined reference model of that word. The feature signals of a subsequent potential vocabulary word are compared against the reference model of each vocabulary word previously stored in the recognizer memory. The speaker is signaled when the potential vocabulary word is confusingly similar to one of the existing vocabulary words.

11 Claims, 2 Drawing Sheets

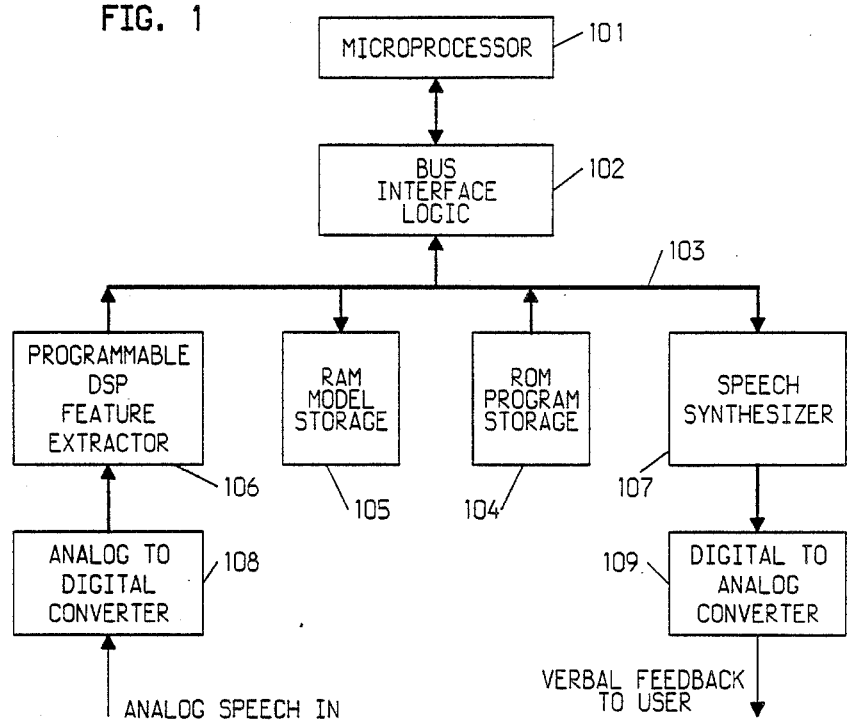
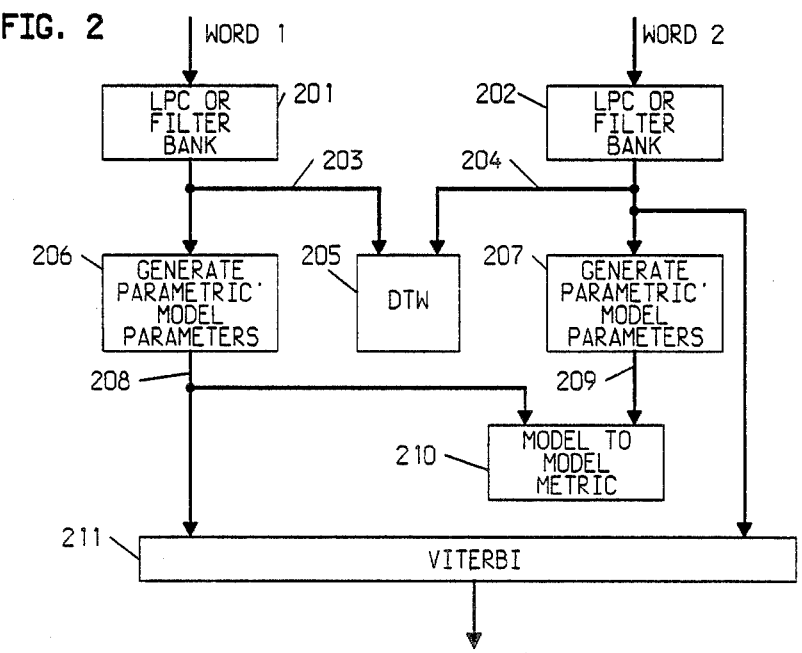

SPEAKER-TRAINED SPEECH RECOGNIZER HAVING THE CAPABILITY OF DETECTING CONFUSINGLY SIMILAR VOCABULARY WORDS

This application is a continuation of application Ser. No. 841,968, filed on Mar. 25, 1986, now abandoned.

TECHNICAL FIELD

This invention is directed to speaker-trained speech recognition systems and, more particularly, to an apparatus and a method for detecting when potentially confusing words have been selected for the vocabulary of such a system.

BACKGROUND OF THE INVENTION

Recent improvements in speech recognition algorithms and hardware have made it possible to develop speaker-trained speech recognition systems that can be used in consumer and small business products. The vast majority of users in this market have no experience with speech recognition systems and, hence, don't understand how to use these systems to obtain the best performance. One problem which causes degraded performance in a speaker-trained speech recognizer is the selection of the vocabulary to be recognized. For example, if the user (i.e., speaker) selects two words that are acoustically similar, such as "Larry" and "Barry", the recognizer will likely have trouble distinguishing them. What is desired is a speaker-trained speech recognition system which indicates to the speaker when vocabulary words are confusingly similar to the system.

SUMMARY OF THE INVENTION

This problem is solved in accordance with the present invention by a speaker-trained speech recognizer which, during the training procedure, detects and signals the speaker of word pairs that are potentially confusing to the recognizer, thereby enabling the speaker to change the word vocabulary selection accordingly. More particularly, the speaker-trained speech recognizer converts speaker vocabulary word utterances into speech feature signals and generates parameters representing a predetermined reference model thereof. The speech features signals of a subsequent potential vocabulary word utterance are compared against this predetermined reference model using predetermined criteria, and the speaker is signaled when any difference therebetween is less than a predetermined value.

BRIEF DESCRIPTION OF THE DRAWING

The operation of the present invention will be more apparent from the following description taken in conjunction with the drawings in which:

FIG. 1 is a block diagram of speech recognizer hardware useful for describing the present invention;

FIG. 2 illustrates various techniques for comparing word utterances; and

GENERAL DESCRIPTION

Figure 3:
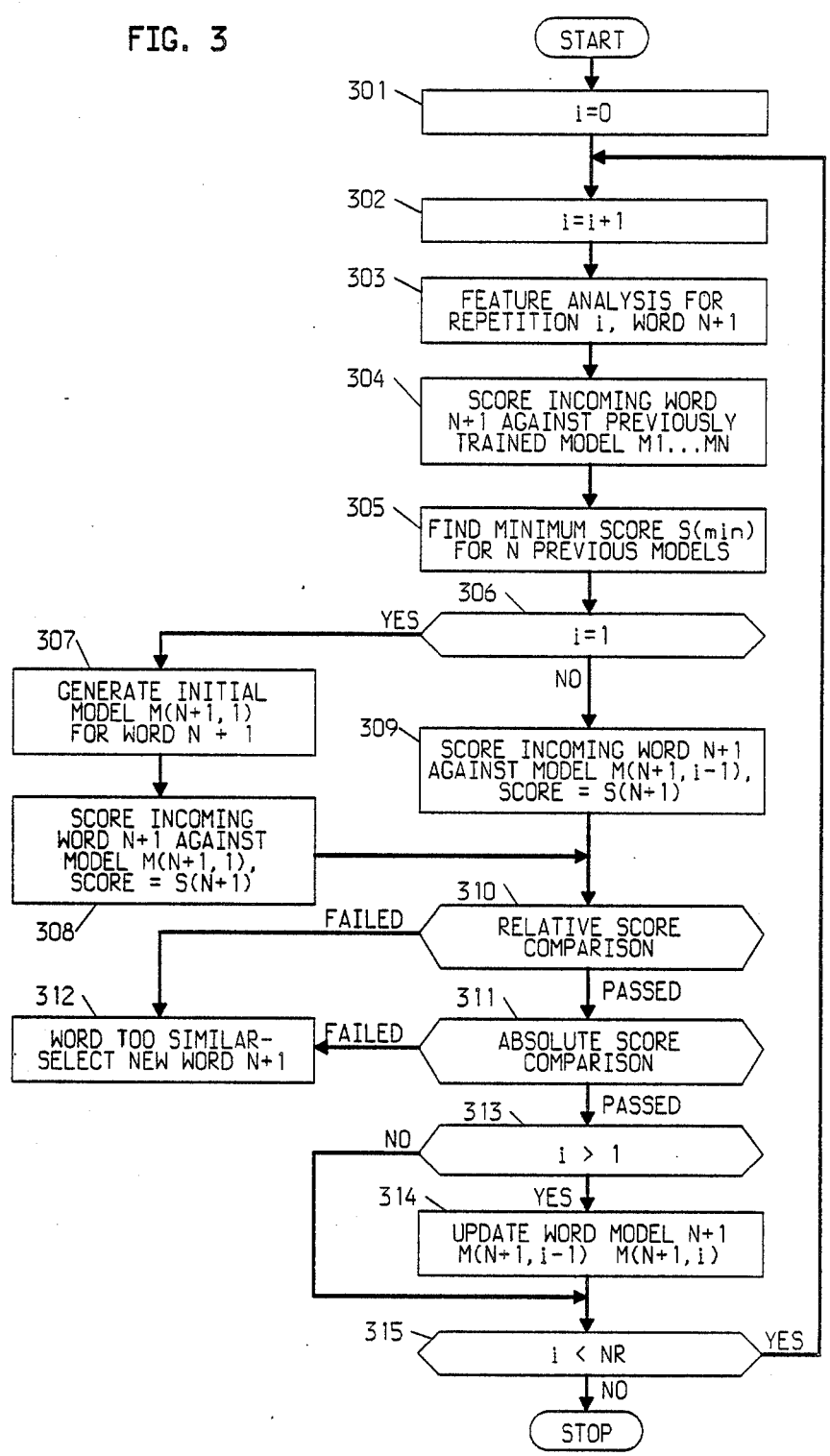
FIG. 3 shows a flow chart describing the training procedure in accordance with the operation of the present invention.

Shown in FIG. 1 is a block diagram of one embodiment of the hardware capable of implementing a speaker-trained speech recognizer according to the present invention. The heart of the implementation is a general purpose microprocessor 101 (e.g., an Intel 8096) which performs the training, pattern matching and overall system control functions in accordance with the flow chart operation illustrated in FIG. 3. Connected to microprocessor bus 103 through bus interface logic 102 is read-only-memory (ROM) 104 for program storage, random-access-memory (RAM) 105 for word model storage, programmable Digital Signal Processor (DSP) 106 (e.g., AT&T DSP20) for extracting features from the speech signal, and speech synthesizer 107 for providing verbal feedback to the speaker. Associated with DSP 106 is an analog-to-digital converter 108 for changing the analog speech signal from a microphone into the discrete quantized samples which are processed by DSP 106. A separate digital-to-analog converter 109 may or may not be needed to convert the output of speech synthesizer 107 to an analog signal. For example, an AT&T 439B synthesizer requires an 8-bit μ-law D/A converter.

The DSP 106 could implement any of several well known feature extraction procedures. For example, a conventional linear predictive coding (LPC) or a multi-channel filter bank technique can be utilized to extract speech features. One illustrative filter bank embodiment utilizes a set of digital bandpass filters which periodically (every 15 msec) estimates the energy in each of eight different frequency bands. The filter bank spans the telephone bandwidth from 200 Hz to 3200 Hz.

Each channel of the filter bank is sampled every 15 msec (frame rate) to ensure that transient speech signals are captured. The eight samples taken at 15 msec intervals provide a snapshot of the speech spectrum at that instant. The resulting feature vector or frame of filter bank data is normalized to reduce the effects of varying amplitude on recognition performance. The normalized filter bank feature vectors are then outputted by DSP 106 for processing by microprocessor 101.

The microprocessor 101 stores the feature vectors from an incoming word in RAM 105 attached to bus 103. As the data from the DSP 106 is being collected, microprocessor 101 looks for the start and end of the word by comparing the energy in the incoming features to several amplitude thresholds. In a well-known manner, durational constraints are also imposed to determine the validity of potential word endpoint candidates. This same operation takes place whenever an utterance is needed for training or recognition processing.

As will be discussed in later paragraphs, all comparisons or scoring of incoming words against models for both training and recognition as well as model generation is done by microprocessor 101. Both the relative and absolute score comparison of the disclosed training procedure are also done by microprocessor 101.

Feedback to the speaker may be provided by speech synthesizer 107 controlled by microprocessor 101. This feedback could include messages prompting the speaker to speak words, reporting the results of recognition, and informing the speaker that the word he/she is trying to train is too similar to previously trained words and that a new word should be selected. In FIG. 1, it has been assumed that all memory required to store verbal messages is included in speech synthesizer 107. Obviously, a visual or text output unit could complement or replace speech synthesizer 107 to give visual or other feedback to the speaker.

Once the recognizer of FIG. 1 has been trained with a word vocabulary by the speaker, it accurately detects any speaker utterances which utilize the vocabulary words. The size of the vocabulary is limited only by the size of the RAM 105 utilized by the recognizer.

DETAILED DESCRIPTION

FIG. 2 illustrates some possible techniques by which the recognizer of FIG. 1 may detect confusingly similar vocabulary word pairs. The recognizer measures the similarity between two given words (e.g., word 1 and word 2) in the vocabulary. One solution may use a metric that can compute the similarity between two models, where a model is defined herein as a template (a time history of speech signal features) or as a parametric representation of the speech signal—e.g., a Hidden Markov Model (HMM). With this definition of a model in the template case, forming a model is accomplished by collecting the feature signals and storing them in memory 105. The templates, 203 and 204, for word 1 and word 2 may be determined using either the LPC or filter bank technique (i.e., 201 and 202).

The template method requires little additional storage because the templates are already stored in the recognition system's memory. For conventional speech recognizers, the two templates 203 and 204 can be compared using the same Dynamic Time Warping (DTW) procedure (205) used in time-aligning an incoming utterance with a template during recognition.

For a parametric speech recognizer, parametric models (206, 207), such as ones based on Hidden Markov Models (HMM), must be generated. In this case, only the parameters of a parametric model (208, 209) of the speech signal are maintained and, therefore, a metric (210) is needed that compares two parametric representations. In practice, metrics 210 that we have tried (such as measuring differences in corresponding state observation distributions) did not adequately predict recognition performance using only model parameters. This HMM technique is described in the two articles S. E. Levinson, L. R. Rabiner, and M. M. Sondhi, "An Introduction to the Application of the Theory of Probabilistic Functions of a Markov Process in Automatic Speech Recognition," *Bell System Technical Journal*, 62, No. 4, Part 1 (Apr. 1983), pp. 1035–1074, and L. R. Rabiner, S. E. Levinson, and M. M. Sondhi, "Application of Vector Quantization and Hidden Markov Models to Speaker Independent, Isolated Word Recognition," *Bell System Technical Journal*, 62, No. 4, Part 1 (Apr. 1983), pp. 1075–1105.

An alternative to comparing parameters of two parametric models for similarity is to take an incoming word 2 utterance and directly compare the derived speech features 204 against the parameters of the previously trained word models 208. The comparison unit 211 may utilize the well-known Viterbi scoring technique to accurately predict recognition performance of the speech recognizer. The remainder of this specification describes a recognizer which operates using this technique.

The training procedure according to the present invention allows a speech recognition system to detect a potentially confusing word pair and provides speakers an opportunity to change their word selection. While the procedure of the present invention is applicable to any of the techniques described in FIG. 2 and can be utilized in virtually any speech recognition system, it is especially useful for recognition algorithms based on parametric speech models.

FIG. 3 shows a flow chart describing the overall operation of the present invention. The following description makes joint reference to FIGS. 1 and 3. In the following description, each element of each figure has a reference designation associated therewith, the first number of which indicates in which figure that element is located (e.g., 301 is located in FIG. 3).

In the following description, the variable "i" indicates the repetition of the word. That is, during the training process a word may be repeated several times by the speaker to enable the recognizer to derive a more accurate model thereof. Thus, $i-1$ indicates a previous utterance of the same word. The predetermined maximum number of repetitions of a word required by the recognizer is NR.

The variable "N" indicates the word number. The word $N+1$ is the word being trained. The model number "M" is depicted with the word number as the first variable and the repetition as the second variable, e.g., $M(N+1, i-1)$. In the example, the model $M(N+1, i-1)$ is for a previous repetition $(i-1)$ of word $N+1$. Once the model is completed, the repetition variable i is dropped; hence $M(N, i)$ becomes MN.

The score $S(N+1)$ is the result of a comparison of features of a word utterance against the resulting model of the same word. The score S(MIN) is the minimum score of a group of scores S1–SN derived when the features of a word utterance are compared against the model of each previous word trained by the recognizer.

Before describing the operation of FIG. 3, we describe the operation of training the recognizer with the first word, that is, generating the model for word 1 (M1). With reference to FIG. 1, when the speaker utters the first word for the first time, A/D converter 108 converts the analog signal to a digital signal, DSP 106 extracts speech features and microprocessor 101 generates a parametric model of the word. As previously discussed, the model may be only a feature template derived from a filter bank of DSP 106. The operation of the disclosed training procedure operates in the same manner and is independent of whether the model is feature based or parameter based.

The following description assumes that DSP 106 first extracts features and then microprocessor 101 generates a parametric parameter model thereof using the HMM process. After the first utterance of the first word, a model M(1, 1) is generated. While not essential to the operation of the present invention, it has been determined that a more accurate word model is generated when multiple utterances of the same word are used to update the model. Thus, according to one aspect of the present invention, the speaker repeats the utterance of the first word a predetermined number of times, NR, and the word model is updated accordingly. After NR such utterances, the word model for the first word is designated as M1 and is stored in RAM 105 by microprocessor 101.

A flow chart illustrating the training procedure for word $N+1$ according to the present invention is shown in FIG. 3. The following description references FIGS. 1 and 3. Again, index i indicates which training repetition is being tested out of the NR total repetitions used to model word $N+1$. It is assumed that words 1 through N have already been trained and associated models M1 to MN generated.

The repetition counter is set to zero, 301, and incremented, 302, when the first utterance of word $N+1$ is received. The first step in the training procedure 303 is used in both training and recognition processes. As noted, Linear Predictive Coding (LPC) and filter bank analysis are two examples of feature analysis methods, but other well-known techniques, as described in the previously referenced articles, may be utilized.

The present embodiment utilizes a filter bank (DSP 106 of FIG. 1) to estimate the energy in each of eight different frequency bands covering the 200 Hz to 3200 Hz telephone bandwidth. Each channel of the filter bank is sampled every 15 msec giving a time history of the log energy in the corresponding frequency band. The 15 msec rate (frame rate) was chosen to be fast enough to capture the transient behavior present in speech signals without having excessive redundancy. The eight samples of the different channels taken at the same time instant form a feature vector or frame of filter bank data and provide a snapshot of the speech spectrum at that instant.

Before the filter bank feature vectors are outputted by DSP 106 for processing by microprocessor 101, they are normalized to reduce the effects of varying speech amplitude on recognition performance.

The resulting set of features (feature vectors) is then compared, 304, to the models (M1 to MN) for the N previously trained vocabulary words. This previous word model comparison technique is identical to the matching algorithm which is to be used to score words during the recognition phase of operation of the recognizer. In a conventional feature pattern-matching recognizer, this might be one of the variations of Dynamic Time Warping. In the present embodiment, the well-known Viterbi scoring is used to compute the probability of the training utterance having been produced by the existing HMM word models.

Viterbi scoring is used as a criteria for comparison between the incoming word features and each of the word models. This recursive algorithm may be stated as:

$$\tau_1(i) = -\log \pi_i - \log b_i(O_1), i = 1, \ldots, N \quad (1)$$

$$\tau_t(j) = \min_{1 \leq i \leq N} [\tau_{t-1}(i) - \log[a_{ij}]] - \log[b_j(O_t)], j = 1, \ldots, N \quad (2)$$

where $O_t$ is the observation corresponding to the $t^{th}$ frame of filter bank data, $\pi_i$ is the probability of starting a state i, $a_{ij}$ is the probability of a transition from state i to state j given the current state is i, and $b_j(O_t)$ is the probability of the observation $O_t$ given the state is j. Log probabilities are used to eliminate multiplications. If there are T frames of data in the spoken word, the score for that word is simply $\tau_T(N)$ since we are forcing the model to end in the last state. In practice, the computations are further simplified by our forcing the model to start in the first state and only allowing recirculation and single format state transitions.

Each of the N comparisons of step 304 results in a Viterbi score indicative of the degree of similarity between the word N+1 and previously trained N words of the recognizer vocabulary.

After scores (S1–SN) have been obtained for the N previously trained words, the scores are searched, in step 305, to find the best match. Since the smaller the Viterbi score, the closer the match, a search of S1–SN for the minimum score S(MIN) is made.

In step 306, if i=1, that is, if the first repetition of the word N+1 is being processed, an initial model M(N+1, 1), step 307, is derived using whatever model or template generation procedure is appropriate for the particular recognition algorithm. (Again, in the present embodiment the well-known HMM modeling procedure is utilized. This procedure is described in the previously referenced articles.) A present word model scoring technique, step 308, compares the derived set of features for the incoming word N+1 against the new model M(N+1, 1) when i=1. If i is not equal to 1 in step 306, the features are compared, 309, in the same manner to the non-updated model M(N+1, i−1) from the previous iteration, again using the same Viterbi scoring technique used in recognition. This results in a present word score S(N+1) representative of typical scores during recognition for the word N+1 when the correct word is spoken. Since the score S(N+1) compares the features derived from word N+1 against the model derived from those features, it gives a good gauge as to how good a score is possible. After the first utterance, when i=1, this score will be artificially low since the same utterance used to derive the model is being used for the comparison. In fact, in a pattern-matching recognizer, the feature set and the model (template) could be identical. This reduces the value of this measure for the first training repetition.

Once the scores S(MIN) of step 305 and S(N+1) of step 308 or 309 have been computed, it is necessary to perform a similarity test to check the similarity of the word N+1 to the previously trained words in the vocabulary. One test, step 310, is a comparison of the relative values of these two scores. If S(MIN) is less than S(N+1)—indicating what would have been a recognition error if this had been a recognition attempt—it is likely that the word N+1 and the word corresponding to S(MIN) are potentially confusing and, hence, the speaker should be warned, 312, and given an opportunity to change the vocabulary word. As previously noted, the speaker is warned verbally using speech synthesizer 107. Two possible relative word similarity tests which generate an index which indicates the similarity of word N+1 to the other N words are as follows:

$$\frac{S(N+1)}{S(MIN)} < TR \quad (1)$$

or alternatively:

$$S(N+1) - S(MIN) < TR1 \quad (2)$$

The quantities TR and TR1 are empirically determined thresholds. Which one of these two comparison tests or other similar methods is used depends on the particular recognition scoring algorithm. The quantity TR is used in the present embodiment of the HMM-based recognizer. If the word N+1 passes this test, a second test may be performed.

A second score comparison test, 311, looks only at the absolute score S(MIN). A low value of this score indicates that the word N+1 was a good match to one of the other N words in the vocabulary and, hence, the speaker should be warned as before with a failure of the relative score comparison test. Note, the value S(MIN) may be normalized in some fashion if its value depends on the duration of the incoming training utterance. The absolute score comparison test may be implemented simply as $$S(MIN) > TA \quad (3)$$

where TA is again an empirically determined threshold and S(MIN) is the duration-normalized version of S(MIN). If Equation (3) is true, then the word N+1 is acceptable.

If i is greater than 1, then the final step 313 in each iteration of the algorithm is to update the current model for the word N+1 when the two score comparison tests 310 and 311 have been passed. This updating step is only performed on iterations where i>1 since a new model has already been generated for the first repetition (i=1) at an earlier step, 307, of the processing. Updating may be as simple as averaging templates together or may involve a more sophisticated robust training procedure. Obviously, the specifics of this step are dependent on the particular recognition algorithm.

If i is less than NR, the predetermined number of repetitions required for the training of each word, the next utterance is requested (302, 303) from the speaker via speech synthesizer 107. If i equals NR, the training process is completed and the updated word model is M(N+1, NR) and it is stored in RAM 105 for use during the speech recognition phase.

What has been described is merely illustrative of one embodiment of the principles of the present invention. Other methods, sequences or apparatus can be used by those skilled in the art to implement the present invention without departing from the spirit and scope of the present invention.

What is claimed is:

1. A speaker-trained speech recognizer for selecting words to be added to a memory of said recognizer, said recognizer comprising
    means for extracting a plurality of feature signals from a received word utterance from a speaker,
    means for generating a plurality of parameters derived from said plurality of feature signals,
    means for comparing a plurality of feature signals of a first word utterance extracted by said extracting means against a plurality of stored parameters of a different previously received word utterance using a predetermined criteria, an output of said comparing means being determined by the difference between said plurality of feature signals of said first word utterance and the plurality of stored parameters of said previously received word utterance,
    means for signaling said speaker to utter into said recognizer a second word utterance, which is different from said first word utterance, when the output of said comparing means is less than a predetermined value indicating a similarity between said feature signals of said first word utterance and said previously received word utterance parameters, and
    means for storing a plurality of parameters of said first word utterance as another different word utterance in said memory when the output of said comparing means indicates that said difference is not less than said predetermined value.

2. The speaker-trained speech recognizer of claim 1 wherein said plurality of parameters of each word utterance is a Hidden Markov Model thereof.

3. The speaker-trained speech recognizer of claim 1 wherein said extracting means includes a filter bank means.

4. The speaker-trained speech recognizer of claim 1 wherein said comparing means includes a Viterbi scoring means.

5. The speaker-trained speech recognizer of claim 1 wherein
    said storing means stores the plurality of parameters of a group of previously received different word utterances in said memory, and wherein
    said comparing means includes
    previous word scoring means for scoring said plurality of feature signals of said first word utterance against the plurality of parameters of each previously received different word utterance of said group using said predetermined criteria, and
    wherein said signaling means signals said speaker when a score of any of the previously received different word utterance in said group is less than said predetermined value.

6. The speaker-trained speech recognizer of claim 5 wherein said comparing means further includes
    first word scoring means for scoring said plurality of feature signals of said first word utterance against the plurality of parameters of said first word utterance derived using said generating means, and wherein
    said comparing means utilizes an output of said first word scoring means and outputs of said previous word scoring means to determine said predetermined value.

7. The speaker-trained speech recognizer of claim 6 wherein
    a lowest score from said previous word scoring means is S(MIN),
    said output of said present word scoring means is S(N+1), and
    said predetermined value is equal to S(N+1)−S(MIN).

8. The speaker-trained speech recognizer of claim 6 wherein
    a lowest score from said previous word scoring means is S(MIN),
    said output of said present word scoring means is S(N+1), and
    said predetermined value is equal to S(N+1) divided by S(MIN).

9. The speaker-trained speech recognizer of claim 6 wherein
    a lowest score from said previous word scoring means is S(MIN) the duration-normalized version of S(MIN), and
    said predetermined value is equal to S(MIN).

10. The speaker-trained speech recognizer of claim 1 including
    means for updating said stored plurality of parameters of said first word utterance in said memory in response to a received repetition of said first word utterance from said speaker.

11. A method of operating a speaker-trained speech recognizer comprising the steps of
    extracting a plurality of feature signals from a received word utterance from a speaker,
    generating a plurality of parameters derived from said plurality of feature signals,
    comparing a plurality of feature signals of a first word utterance extracted by said extracting step against a plurality of stored parameters of a different previously received word utterance using a predetermined criteria, an output of said comparing being determined by the difference between said plurality of feature signals of said first word utterance and the plurality of stored parameters of said previously received different word utterance, signaling said speaker to utter into said recognizer a second word utterance, which is different from said first word utterance, when the output of said comparing step is less than a predetermined value indicating a similarity between said feature signals of said first word utterance and said previously received word utterance parameters, and storing a plurality of parameters of said first word utterance as another different word utterance in said memory when the output of said comparing step indicates that said difference is not less than said predetermined value.

* * * * *

UNITED STATES PATENT AND TRADEMARK OFFICE
CERTIFICATE OF CORRECTION

PATENT NO. : 4,972,485

DATED : November 20, 1990

INVENTOR(S) : Bruce A. Dautrich et al.

It is certified that error appears in the above-identified patent and that said Letters Patent is hereby corrected as shown below:

Column 8, lines 47-48, should read --means is S(MIN), and--; line 49, "S(MIN)" should read --$\hat{S}$(MIN) the duration-normalized version of S(MIN).--.

Signed and Sealed this

Eighteenth Day of July, 1995

Attest:

BRUCE LEHMAN

Attesting Officer     Commissioner of Patents and Trademarks